United States Patent
Koiwa et al.

(10) Patent No.: US 11,799,104 B2
(45) Date of Patent: Oct. 24, 2023

(54) METHOD OF OPERATING FUEL CELL SYSTEM

(71) Applicant: HONDA MOTOR CO., LTD., Tokyo (JP)

(72) Inventors: Nobuki Koiwa, Wako (JP); Masaoki Inamoto, Wako (JP); Hideo Numata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 152 days.

(21) Appl. No.: 17/213,835

(22) Filed: Mar. 26, 2021

(65) Prior Publication Data

US 2021/0305600 A1    Sep. 30, 2021

(30) Foreign Application Priority Data

Mar. 30, 2020 (JP) .................................. 2020-059939

(51) Int. Cl.
*H01M 8/04223* (2016.01)
*H01M 8/04089* (2016.01)
(Continued)

(52) U.S. Cl.
CPC ... *H01M 8/04253* (2013.01); *H01M 8/04097* (2013.01); *H01M 8/04111* (2013.01);
(Continued)

(58) Field of Classification Search
CPC ......... H01M 8/04253; H01M 8/04097; H01M 8/04686; H01M 8/04738; H01M 8/04917; H01M 8/04313; H01M 8/04694
(Continued)

(56) References Cited

U.S. PATENT DOCUMENTS

2004/0106026 A1*  6/2004  Fujita ................ H01M 8/04225
                                                                429/423
2006/0153687 A1   7/2006  Ishikawa et al.
(Continued)

FOREIGN PATENT DOCUMENTS

JP     2007-214080 A    8/2007
JP       4179855 B2    11/2008
(Continued)

OTHER PUBLICATIONS

Office Action dated Aug. 8, 2023 issued in the corresponding Japanese Patent Application No. 2020-059939 with the English machine translation thereof.

*Primary Examiner* — Christian Roldan
(74) *Attorney, Agent, or Firm* — Carrier, Shende & Associates P.C.; Joseph P. Carrier; Jeffrey T. Gedeon

(57) ABSTRACT

A fuel cell system includes a fuel cell stack, a fuel gas supply channel, a fuel gas circulation channel, a circulating pump that is driven by a pump motor having no rotation detecting sensor, and an ECU. When a method for operating the fuel cell system determines that the circulating pump is frozen in a low-temperature environment, the method performs a first step of performing a brake mode to limit the rotation of the pump motor while passing current to the pump motor, to thereby heat the pump motor. The method further performs a second step of, after rotating the pump motor, determining that the circulating pump has unfrozen if the rotational speed of the pump motor exceeds a given value.

6 Claims, 7 Drawing Sheets

(51) Int. Cl.
    *H01M 8/04082*     (2016.01)
    *H01M 8/04664*     (2016.01)
    *H01M 8/04701*     (2016.01)
    *H01M 8/04858*     (2016.01)
    *H01M 8/04111*     (2016.01)

(52) U.S. Cl.
    CPC ... *H01M 8/04201* (2013.01); *H01M 8/04686* (2013.01); *H01M 8/04738* (2013.01); *H01M 8/04917* (2013.01)

(58) Field of Classification Search
    USPC .......................................................... 429/415
    See application file for complete search history.

(56) References Cited

U.S. PATENT DOCUMENTS

| | | | |
|---|---|---|---|
| 2009/0023020 A1 | 1/2009 | Hamada | |
| 2009/0325000 A1* | 12/2009 | Gangwar | H01M 8/04253 429/406 |
| 2014/0295307 A1* | 10/2014 | Toida | B60L 3/0053 429/432 |

FOREIGN PATENT DOCUMENTS

| | | |
|---|---|---|
| JP | 4248225 B2 | 4/2009 |
| JP | 5226936 B2 | 7/2013 |
| JP | 2015-048811 A | 3/2015 |
| JP | 2015-048812 A | 3/2015 |
| JP | 2018-152287 A | 9/2018 |
| JP | 2018-156743 A | 10/2018 |

* cited by examiner

METHOD OF OPERATING FUEL CELL SYSTEM

CROSS-REFERENCE TO RELATED APPLICATION

This application is based upon and claims the benefit of priority from Japanese Patent Application No. 2020-059939 filed on Mar. 30, 2020, the contents of which are incorporated herein by reference.

BACKGROUND OF THE INVENTION

Field of the Invention

The present invention relates to a method of operating a fuel cell system including a circulating pump for circulating reactant gas.

Description of the Related Art

A fuel cell system supplies reactant gases (fuel gas, oxygen-containing gas) into a fuel cell stack and generates electricity through electrochemical reactions in the fuel cell stack. Among fuel cell systems of this kind, as disclosed in Japanese Patent No. 4248225, some fuel cell systems have a circulating pump for circulating fuel off-gas discharged from the fuel cell stack back into the fuel gas supply channel so as to ensure the flow rate of the fuel gas circulated into the fuel cell stack. The fuel cell system disclosed in Japanese Patent No. 4248225 adopts a circulating pump with a motor having no sensor (sensorless) from the standpoints of cost reduction and size reduction.

SUMMARY OF THE INVENTION

By the way, in such a fuel cell system, the rotation of the circulating pump may be hindered if water vapor contained in the reactant gas freezes within the circulating pump in a low-temperature environment (e.g., below the freezing point). In particular, if the impeller coupled to the rotor of the circulating pump and the casing of the circulating pump are stuck together, the impeller becomes unable to rotate and the circulation of the reactant gas stops.

However, such conventional fuel cell systems have not considered configurations for unfreezing the circulating pump. Passible measures to be taken to unfreeze the circulating pump include providing the circulating pump with a heater, which, however, increases the size and costs of the circulating pump.

The present invention has been devised to solve the problem above, and an object of the invention is to provide a method of operating a fuel cell system that can efficiently unfreeze a frozen circulating pump so that the reactant gas can be circulated stably even in low-temperature environments.

In order to achieve the object, a first aspect of the invention is directed to a method of operating a fuel cell system including a fuel cell stack, a reactant gas supply channel configured to supply a reactant gas into the fuel cell stack, a reactant gas circulation channel configured to circulate a reactant off-gas discharged from the fuel cell stack back into the reactant gas supply channel, a circulating pump provided on the reactant gas circulation channel and driven by a motor having no rotation detecting sensor, and a control unit configured to control rotation of the motor. The fuel cell system operating method includes: a freezing judging step of, in a low-temperature environment, causing the control unit to determine whether the circulating pump is frozen or not; a first step of, if the freezing judging step determines that the circulating pump is frozen, performing a brake mode to limit the rotation of the motor while passing current to the motor, to thereby heat the circulating pump; and a second step of, after rotating the motor, comparing a rotational speed of the motor with a given value and determining that the circulating pump has unfrozen if the rotational speed of the motor exceeds the given value.

The method of operating the fuel cell system can efficiently unfreeze the frozen circulating pump by performing the brake mode. Since the circulating pump unfreezes, the circulating pump can be operated with good timing when necessary to circulate the reactant gas stably even in a low-temperature environment. For example, by circulating the reactant gas using the circulating pump, the fuel cell system offers effects of shortening the processing time when starting its operation, effectively performing processes (in-stopping power generation etc.) for improving the durability of the fuel cell stack when stopping its operation, and so on. This improves the marketability of the fuel cell system.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The present invention will be described in detail in connection with preferred embodiments while referring to the accompanying drawings.

First Embodiment

Figure 1:
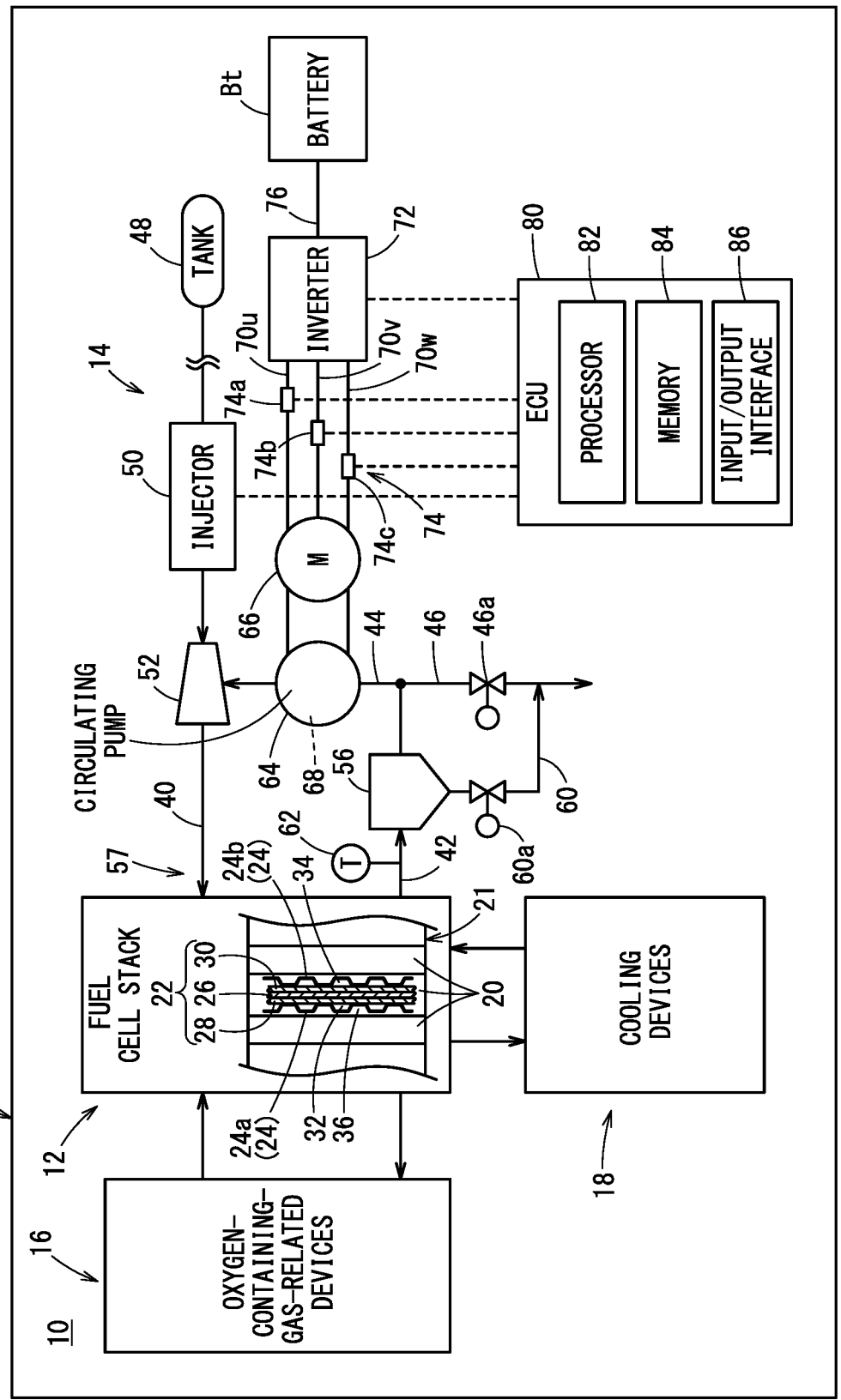
FIG. 1 is an explanatory diagram schematically illustrating an overall configuration of a fuel cell system according to a first embodiment of the present invention.

As shown in FIG. 1, a fuel cell system 10 according to a first embodiment of the present invention includes a fuel cell stack 12, fuel-gas-related devices 14, oxygen-containing-gas-related devices 16, and cooling devices 18. The fuel cell system 10 is installed in, for example, a motor room of a fuel cell automobile (which will hereinafter be simply referred to as vehicle 11). The fuel cell system 10 supplies the electric power generated by the fuel cell stack 12 to a battery Bt of the vehicle 11, its drive motor (not shown), and so on. The fuel cell system 10 is not limited to applications in which it is mounted in the vehicle 11, and may be used in stationary systems, for example.

The fuel cell stack 12 includes a plurality of power generation cells 20 that generate electricity through electrochemical reactions between reactant gases, i.e. a fuel gas (a hydrogen gas, anode gas) and an oxygen-containing gas (oxygen contained in air, cathode gas). The plurality of power generation cells 20 are stacked along the vehicle width direction in such a manner that their respective electrode planes are in a standing position when the fuel cell stack 12 is mounted in the vehicle 11. The plurality of power generation cells 20 may be stacked along the length direction of the vehicle 11 (front-rear direction) or the gravity direction.

Each power generation cell 20 includes a membrane electrode assembly 22 (hereinafter referred to as "MEA 22") and a pair of separators 24 (a first separator 24a and a second separator 24b) that sandwich the MEA 22 therebetween. The MEA 22 includes an electrolyte membrane 26 (e.g. solid polymer electrolyte membrane (cation exchange membrane)), an anode 28 provided at one surface of the electrolyte membrane 26, and a cathode 30 provided at the other surface of the electrolyte membrane 26. The first separator 24a and the MEA 22 form a fuel gas flow field 32 therebetween through which the fuel gas flows along the separator surface. The second separator 24b and the MEA 22 form an oxygen-containing gas flow field 34 therebetween through which the oxygen-containing gas flows along the separator surface. Further, as the plurality of power generation cells 20 are stacked, the first separator 24a and the second separator 24b form a coolant flow field 36 therebetween through which a coolant flows along the separator surfaces.

The fuel cell stack 12 further includes a plurality of passages (fuel gas passages, oxygen-containing gas passages, and coolant passages, which are not shown) for respectively conveying the fuel gas, the oxygen-containing gas, and the coolant along the stacking direction of a stack 21. The fuel gas passages communicate with the fuel gas flow field 32, the oxygen-containing gas passages communicate with the oxygen-containing gas flow field 34, and the coolant passages communicate with the coolant flow field 36.

The fuel cell stack 12 is supplied with the fuel gas through the fuel-gas-related devices 14. In the fuel cell stack 12, the fuel gas flows through the fuel gas passage (fuel gas inlet passage) into the fuel gas flow field 32 and is used to generate power at the anode 28. The fuel off-gas (reactant off-gas), which contains fuel gas not used in the power generation and water, flows out of the fuel gas flow field 32 into the fuel gas passage (fuel gas outlet passage) and is discharged out of the fuel cell stack 12 into the fuel-gas-related devices 14.

The fuel cell stack 12 is further supplied with the oxygen-containing gas through the oxygen-containing-gas-related devices 16. In the fuel cell stack 12, the oxygen-containing gas flows through the oxygen-containing gas passage (oxygen-containing gas inlet passage) into the oxygen-containing gas flow field 34, and is used to generate power at the cathode 30. The oxygen-containing off-gas, which contains oxygen-containing gas not used (unreacted) in the power generation and water, flows out of the oxygen-containing gas flow field 34 into the oxygen-containing gas passage (oxygen-containing gas outlet passage) and is discharged out of the fuel cell stack 12 into the oxygen-containing-gas-related devices 16.

The fuel cell stack 12 is further supplied with the coolant through the cooling devices 18. In the fuel cell stack 12, the coolant flows through the coolant passage (coolant inlet passage) into the coolant flow field 36 to adjust the temperature of the power generation cell 20. Having adjusted the temperature of the power generation cell 20, the coolant flows out of the coolant flow field 36 into the coolant passage (coolant outlet passage) and is discharged out of the fuel cell stack 12 into the cooling devices 18.

The fuel-gas-related devices 14 of the embodiment form a circulation circuit that circulates the fuel off-gas (unreacted fuel gas) discharged from the fuel cell stack 12 back into the fuel gas supply side. The fuel-gas-related devices 14 will be specifically described below.

The fuel-gas-related devices 14 include a fuel gas supply channel 40 (reactant gas supply channel) for supplying the fuel gas into the fuel cell stack 12, and a fuel gas discharge channel 42 for discharging the fuel off-gas from the fuel cell stack 12. Further, a fuel gas circulation channel 44 (reactant gas circulation channel) is provided between the fuel gas supply channel 40 and the fuel gas discharge channel 42 so as to circulate the fuel off-gas in the fuel gas discharge channel 42 back into the fuel gas supply channel 40. A purge channel 46 for discharging the fuel off-gas from the circulation circuit is connected to the fuel gas circulation channel 44.

A tank 48 storing high-pressure fuel gas is connected to the upstream end of the fuel gas supply channel 40. The tank 48 sends the fuel gas into the fuel gas supply channel 40 on the basis of the opening/closing of an in-tank electromagnetic valve (not shown) and a pressure reducing valve (not shown) provided on the way therefrom.

An injector 50 for controlling the flow rate of the fuel gas supplied into the fuel cell stack 12 is provided on the fuel gas supply channel 40 downstream of the tank 48. While the fuel cell system 10 is operating, the injector 50 opens and closes on the upstream side (higher-pressure side) of the fuel gas supply channel 40 to inject a given amount of fuel gas to the downstream side (lower-pressure side). FIG. 1 shows a configuration including one injector 50, but a plurality of injectors 50 may be provided on the fuel gas supply channel 40. When a plurality of injectors 50 are present, some of them may be provided on a bypass channel (not shown) that bypasses an ejector 52 described next.

The ejector 52 is provided downstream of the injector 50 on the fuel gas supply channel 40. The ejector 52 supplies the fuel gas into the fuel cell stack 12 provided downstream, while drawing the fuel gas from the fuel gas circulation channel 44 by utilizing the negative pressure produced by the movement of the fuel gas injected from the injector 50.

Further, a gas-liquid separator 56 is provided between the fuel gas discharge channel 42 and the fuel gas circulation channel 44 so as to separate liquid (liquid water formed in power generation) and gas (fuel gas, water vapor, nitrogen gas, etc.) that are contained in the fuel off-gas. Connected to the bottom of the gas-liquid separator 56 is one end of a drain channel 60 for discharging the separated liquid. The drain channel 60 has a drain valve 60a for opening and closing the channel, and the drain channel 60 is connected to the purge channel 46. The purge channel 46 discharges the fuel gas and nitrogen gas from the fuel gas circulation channel 44 to thereby increase the hydrogen gas concentration inside the circulation passage that is formed by the fuel gas supply channel 40 downstream of the ejector 52, the fuel gas discharge channel 42, and the fuel gas circulation channel 44. A purge valve 46a for opening and closing the channel is provided on the purge channel 46 in a position upstream of the connection with the drain channel 60.

The fuel gas circulation channel 44 is connected to an upper portion of the gas-liquid separator 56, and the fuel off-gas from which liquid water has been separated flows therethrough. A circulating pump 64 for circulating the fuel off-gas into the fuel gas supply channel 40 is provided on the fuel gas circulation channel 44. The fuel-gas-related devices 14 further include a temperature sensor 62 for detecting a temperature of the fuel gas flowing into the circulating pump 64.

The temperature sensor 62 is provided on the fuel gas discharge channel 42 in the vicinity of the outlet of the fuel cell stack 12, so as to detect the temperature of the fuel off-gas discharged from the fuel cell stack 12. The temperature sensor 62 may be configured to directly detect the temperature of the fuel off-gas inside the circulating pump 64 or to detect the temperature of the fuel off-gas flowing out from the circulating pump 64.

The circulating pump 64 has a pump motor 66 having a stator and a rotor (both not shown), and an impeller 68 coupled to the rotor. The impeller 68 rotates within the space in the pump casing (not shown) that communicates with the fuel gas circulation channel 44, to thereby circulate the fuel off-gas present in the space. The circulating pump 64 of this embodiment is of a sensorless type having no rotation detecting sensor, such as an encoder etc., for directly detecting the rotational speed of the rotor or the impeller 68.

The pump motor 66 is an alternating-current motor that rotates the rotor under the supply of three-phase alternating-current power to the stator. Accordingly, an inverter 72 is connected to the pump motor 66 through three-phase alternating-current lines 70u, 70v, 70w. The pump motor 66 of this embodiment is configured as a synchronous motor that rotates in synchronization with the frequency of the alternating current.

On the three lines 70u, 70v, 70w, current sensors 74 are provided to detect the states of the alternating currents supplied to the pump motor 66. More specifically, the current sensors 74 include a current sensor 74a provided on the line 70u, a current sensor 74b provided on the line 70v, and a current sensor 74c provided on the line 70w. The current sensors 74a, 74b, 74c are configured to detect the amplitudes and periods (in other words, the pulse shapes) of the currents flowing through the lines 70u, 70v, 70w.

The inverter 72 is connected to the battery Bt serving as a power supply source through a line 76. Though not shown in the drawing, a converter or the like may be provided on the line 76 between the inverter 72 and the battery Bt so as to step down the voltage supplied from the battery Bt. The inverter 72 converts the direct-current power supplied from the battery Bt into three-phase alternating-current power and outputs the converted three-phase alternating-current power to the lines 70u, 70v, 70w. The inverter 72 is communicably connected to an ECU (Electronic Control Unit: control unit) 80 that controls the fuel-gas-related devices 14, and the inverter 72 controls the current, voltage, period, etc. of the three-phase alternating-current power supplied to the pump motor 66, on the basis of operation commands from the ECU 80.

The battery Bt is charged by being supplied with the electric power generated by the fuel cell stack 12, or the regenerative power from the drive motor. The battery Bt discharges an appropriate amount of electric power to the inverter 72 under the control of the power train (the inverter 72 in FIG. 1).

Figure 2:
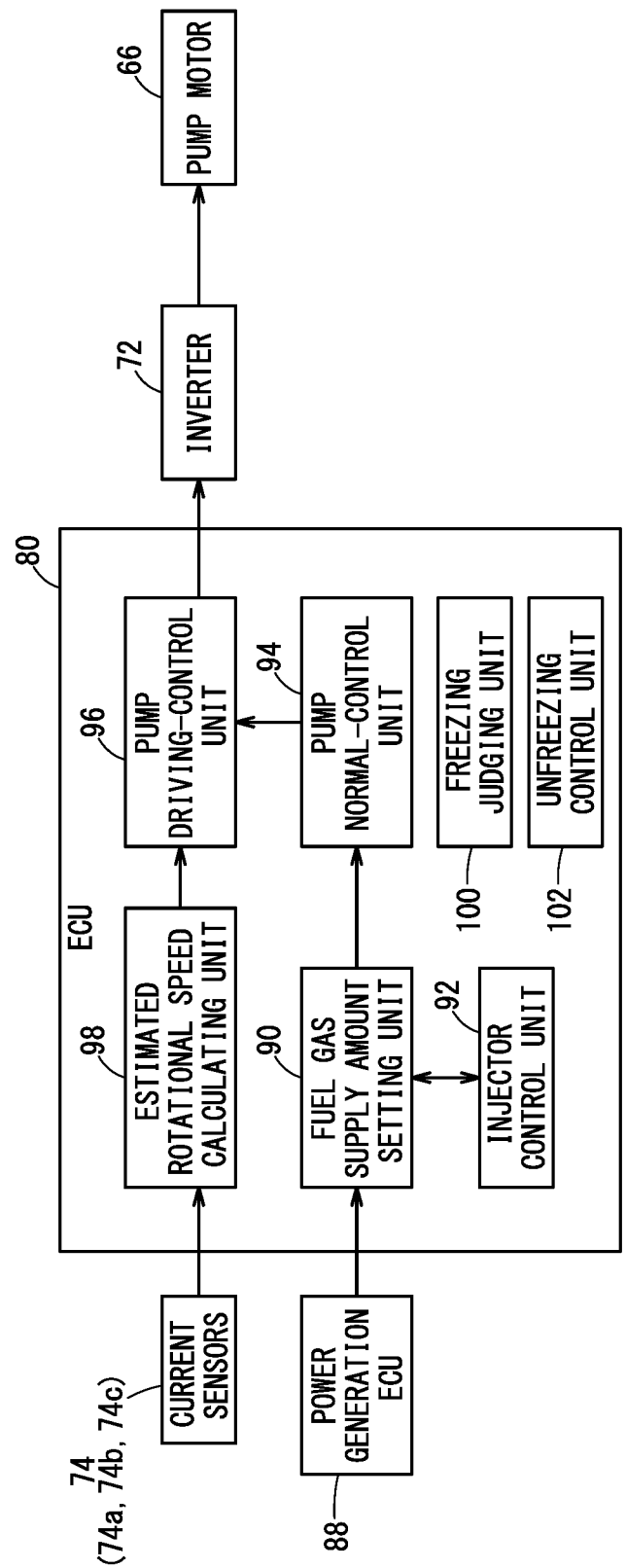
FIG. 2 is a block diagram illustrating a configuration in an ECU for controlling a circulating pump.

The ECU 80 is configured as a computer including a processor 82, a memory 84, and an input/output interface 86. The above-described temperature sensor 62 and current sensors 74 (current sensors 74a to 74c), and a power generation ECU 88 (see FIG. 2) for controlling the entirety of the fuel cell system 10, are communicably connected to the ECU 80. The ECU 80 may be provided integrally with the power generation ECU 88. During normal operation of the fuel cell stack 12, the ECU 80 controls the operations of the fuel-gas-related devices 14 by configuring functional units therein as shown in FIG. 2, by the processor 82 executing programs (not shown) stored in the memory 84.

Specifically, the ECU 80 configures therein a fuel gas supply amount setting unit 90, an injector control unit 92, a pump normal-control unit 94, a pump driving-control unit 96, and an estimated rotational speed calculating unit 98.

The fuel gas supply amount setting unit 90 sets the amount of fuel gas supplied into the fuel cell stack 12, based on the amount of power generation requirement from the power generation ECU 88. Based on the amount of supply of the fuel gas set by the fuel gas supply amount setting unit 90, the injector control unit 92 calculates the contents of operation of the injector 50 (i.e. the amount of fuel gas injected from the tank 48 side), and controls the injector 50 based on the contents of operation.

On the other hand, the pump normal-control unit 94 calculates a target rotational speed of the circulating pump 64 (i.e., the amount of the fuel off-gas circulated from the fuel gas circulation channel 44) based on the amount of supply of the fuel gas that is set by the fuel gas supply amount setting unit 90. Based on the target rotational speed of the circulating pump 64, the pump driving-control unit 96 sets the conditions of the three-phase alternating-current power supplied to the circulating pump 64, and outputs corresponding operation commands to the inverter 72. This causes the inverter 72 to supply three-phase alternating-current power according to the target rotational speed indicated by the operation commands, to thereby rotate the pump motor 66.

Then, the estimated rotational speed calculating unit 98 calculates an estimated rotational speed of the pump motor 66 based on the signals detected by the current sensors 74a, 74b, 74c that are inputted to the ECU 80. Specifically, as to the pump motor 66, the supplied three-phase alternating-current power includes a phase not passing current (being off), and the ECU 80 receives the detection signal of the current sensor 74 corresponding to this phase, and detects the position of the rotor based on a given point (e.g. the zero point) of the detected current. Then, the estimated rotational speed calculating unit 98 monitors the position of the rotor to calculate (estimate) an actual rotational speed of the pump motor 66. Further, the pump driving-control unit 96 is supplied (fed back) with the calculated, estimated rotational speed, and controls the operation commands to the inverter 72 so that this estimated rotational speed coincides with the target rotational speed.

Now, when the vehicle 11 is in a low-temperature environment below the freezing point (at or below zero degrees), for example, and if the fuel off-gas contains water vapor as mentioned earlier, then the water vapor will freeze into ice inside the pump casing of the circulating pump 64. In this case, the inner wall of the pump casing (not shown) and the impeller 68 may get stuck together, and the impeller 68 will become unable to rotate.

In order to solve this problem, a freezing judging unit 100 and an unfreezing control unit 102 are configured in the ECU 80. The freezing judging unit 100 determines whether the circulating pump 64 is frozen or not before starting the operation of the circulating pump 64. The timing for starting the operation of the circulating pump 64 is when the amount of supply of the fuel gas is insufficient stoichiometrically, such as when the fuel cell system 10 is started (ignition on), when high-current power generation is performed due to a requirement for increased current to the auxiliary machinery etc. during normal operation, or when the operation of the fuel cell system 10 is stopped (ignition off), for example.

When determining whether the circulating pump 64 is frozen or not, the freezing judging unit 100 determines that there is a possibility that the circulating pump 64 may be frozen if any of the conditions (a) to (g) listed below is met, for example.
- (a) The estimated rotational speed of the circulating pump 64 does not rise gradually.
- (b) The fuel cell system 10 in which the circulating pump 64 is operated did not start (the starting failed).
- (c) The temperature in the surrounding environment around the fuel cell system 10 is low, or it is estimated that the next starting will be done at low temperature.
- (d) A sensor (temperature sensor 62, pressure sensor, etc.) for detecting the condition of the reactant gas in the fuel cell system 10 is malfunctioning.
- (e) The output of the fuel cell stack 12 does not rise to the amount of power generation requirement.
- (f) The relay of the circulating pump 64 is malfunctioning.
- (g) In-vehicle communication has some trouble.

As can be seen from the conditions (a) to (g) above, the freezing judging unit 100 determines that the circulating pump 64 is frozen if there is a possibility that the circulating pump 64 is even slightly frozen, even if the circulating pump 64 is not frozen in fact. This is because the ECU 80 can determine whether the circulating pump 64 is frozen or not more reliably in a shorter time by executing the unfreezing control operation after making the freezing judgment.

Further, even when the circulating pump 64 was frozen when the operation was started and then was unfrozen after that, it may freeze again during normal operation or when the operation is stopped, if the temperature in the surrounding environment is low or if the circulating pump 64 is in a stopped state continuously, for example. Accordingly, the freezing judging unit 100 is configured to determine whether the circulating pump 64 is frozen or not again at given time intervals or when the circulating pump 64 is used actually.

On the other hand, the unfreezing control unit 102 in the ECU 80 performs an unfreezing control operation for unfreezing the circulating pump 64 when the circulating pump 64 is frozen. Note that the circulating pump 64 of this embodiment does not have a heater by itself, for example, at the pump casing. Accordingly, the unfreezing control makes use of the function of a brake mode that brakes the rotation of the synchronous pump motor 66 to detect the position of the rotor. That is, the brake mode stops the rotation of the pump motor 66 while supplying three-phase alternating-current power to the pump motor 66, whereby the electric power supplied to the pump motor 66 promotes heating of the entire circulating pump 64.

Figure 3:
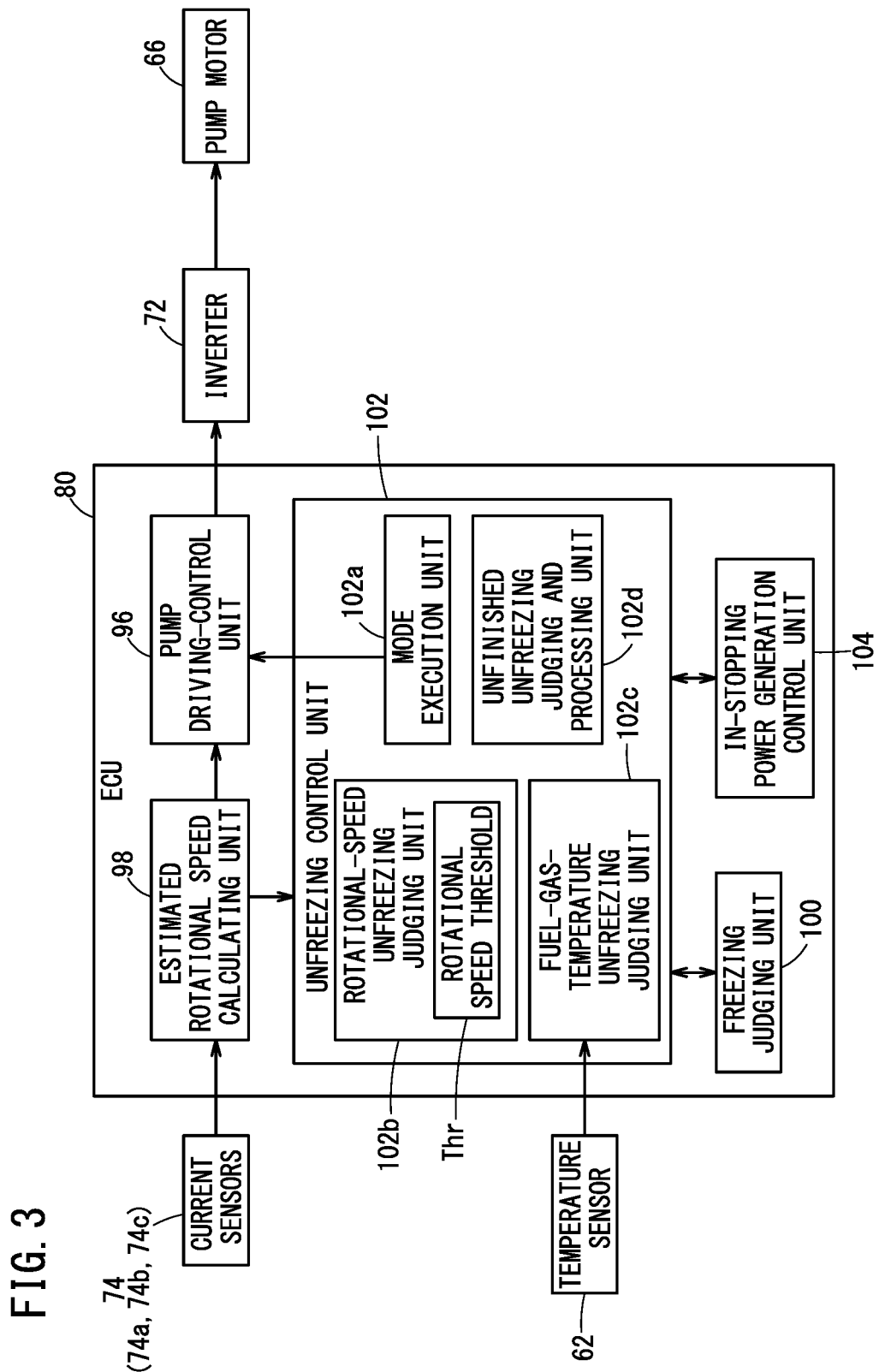
FIG. 3 is a block diagram illustrating a configuration in the ECU for performing a freezing judging operation and an unfreezing control operation.
Figure 4:
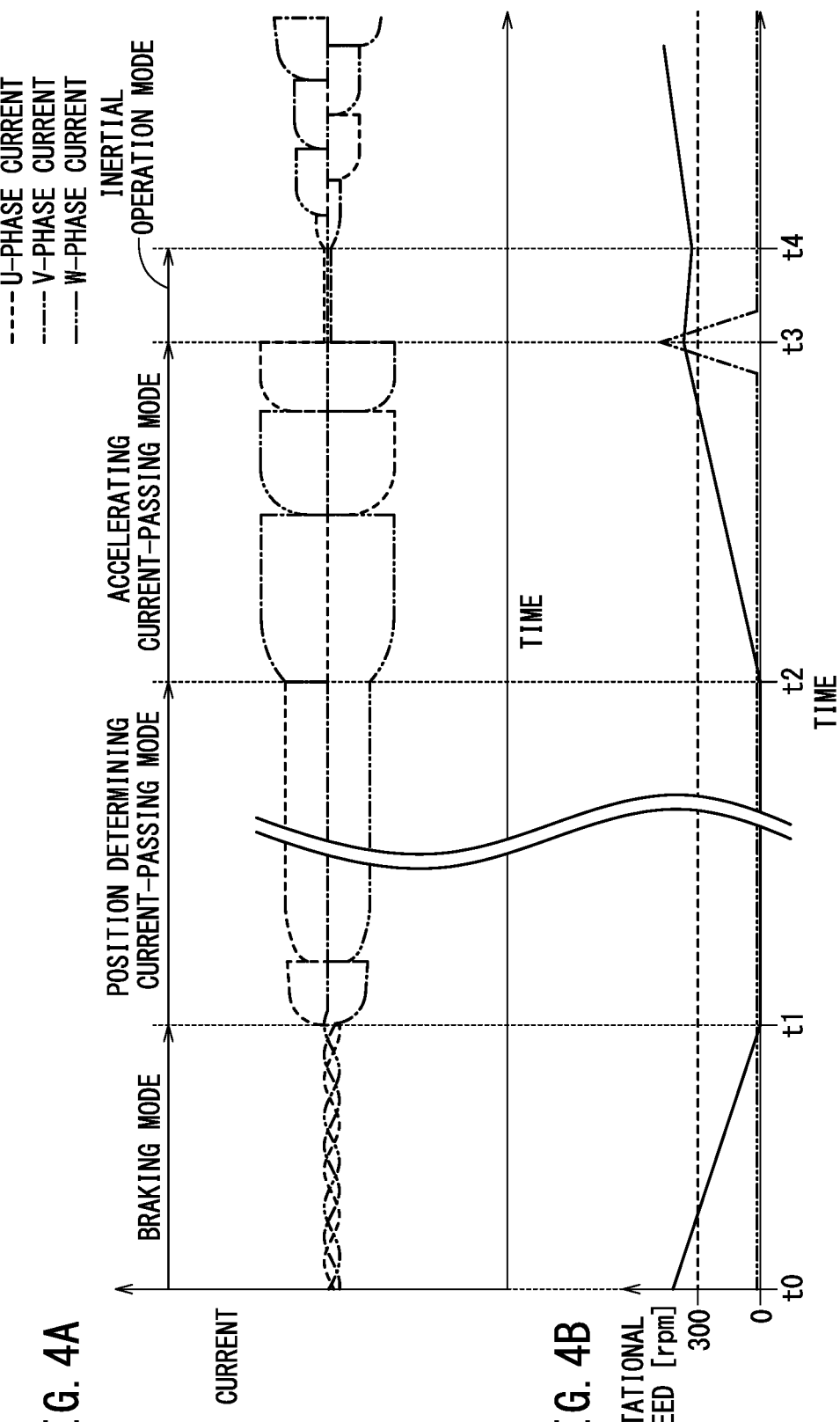
FIG. 4A is a graph illustrating conditions of current outputted from an inverter in a brake mode.
FIG. 4B is a graph showing examples of the rotational speed of a pump motor during the brake mode.

For this purpose, as shown in FIG. 3, the unfreezing control unit 102 configures therein a mode execution unit 102*a*, a rotational-speed unfreezing judging unit 102*b*, a fuel-gas-temperature unfreezing judging unit 102*c*, and an unfinished unfreezing judging and processing unit 102*d*. The brake mode performs multiple kinds of modes sequentially, where three-phase alternating-current power having different waveforms is supplied to the pump motor 66 in different modes. More specifically, as shown in FIG. 4A, the multiple kinds of modes of the brake mode include a braking mode, a position determining current-passing mode, an accelerating current-passing mode, and an inertial operation mode. The mode execution unit 102*a* of the unfreezing control unit 102 operates to execute these modes sequentially.

That is, the mode execution unit 102*a* sets a control flag (not shown) indicating the unfreezing control at time t0, and then first performs the braking mode in the period from t0 to t1. In the braking mode, three-phase alternating-current power with sufficiently small current value is supplied to the pump motor 66. The pump motor 66 then becomes substantially unable to synchronize with the period of the three-phase alternating current being supplied, and its rotational speed lowers. This braking mode is continued until the rotational speed of the pump motor 66 becomes a given value or lower (e.g. 0 rpm).

When the rotational speed of the pump motor 66 has been lowered by the braking mode, the mode execution unit 102*a* performs the position determining current-passing mode in the next period from time t1 to time t2. In this position determining current-passing mode, the inverter 72 is controlled to output current that has a waveform in which one phase of the three-phase alternating currents remains off (zero) and the other two phases output currents in the opposite plus and minus directions with a long pulse width, for example. That is, the three-phase alternating currents supplied to the pump motor 66 become zero current in its entirety. Then, the pump motor 66 fixes the position of the rotor by the two phases of the stator to which the currents are supplied, and the ECU 80 grasps the rotor position based on the signals detected by the current sensors 74 at this time.

For example, the pulse width of the current in the position determining current-passing mode is set around several seconds (e.g. two seconds). Further, the mode execution unit 102*a* sets the current value of the three-phase alternating-current power supplied in the position determining current-passing mode to be higher than the current value of the three-phase alternating-current power supplied in the braking mode. This current value (the peak value of the alternating current) is not particularly limited, but is preferably set to be equal to or higher than 10 A, for example.

Furthermore, the mode execution unit 102*a* performs the accelerating current-passing mode in the period from time t2 to time t3. In the accelerating current-passing mode, the phases of the three-phase alternating current are shifted in such a manner as to gradually narrow the period from a relatively long period, to thereby smoothly rotate the rotor with high torque. The pump motor 66 thus raises its rotational speed gradually. The current value of the three-phase alternating-current power supplied in the accelerating current-passing mode is set to be further higher than the current value of the three-phase alternating-current power supplied in the position determining current-passing mode. The current value in the accelerating current-passing mode (the peak value of the alternating current) is not particularly limited, either, but it is preferably set to be equal to or higher than 20 A, for example.

The mode execution unit 102*a* previously determines the execution time of the accelerating current-passing mode. If the circulating pump 64 is not frozen, the rotational speed of the pump motor 66 becomes equal to or higher than a lowest readable rotational speed (a value of the rotational speed readable with the signals detected by the current sensors 74) during the execution of the accelerating current-passing mode. Accordingly, it can be said that whether the circulating pump 64 is frozen can be determined by detecting the rotational speed of the pump motor 66 after the execution period of the accelerating current-passing mode (after time t3).

Therefore, in the inertial operation mode after time t3, the mode execution unit 102*a* temporarily cuts off (stops) the three-phase alternating-current power supplied to the pump motor 66 so that the rotor of the pump motor 66 and the impeller 68 rotates by inertia. Then, the rotational-speed unfreezing judging unit 102*b* checks the estimated rotational speed of the pump motor 66 in the execution period of the inertial operation mode (inertial period), thereby judging whether the circulating pump 64 is frozen or not.

For example, after time t3 at which the inertial operation mode starts, the rotational-speed unfreezing judging unit 102*b* counts time and performs the inertial operation mode for a given time period (e.g. 30 ms), and then it judges whether the circulating pump 64 is frozen or not based on the estimated rotational speed of the pump motor 66. That is, if the circulating pump 64 is normal (not frozen), the rotor and the impeller 68 continue rotating even after the given time period has ended. On the other hand, if the circulating pump 64 is abnormal (frozen), the rotor and the impeller 68 are frozen and stuck (unable to rotate), in which case the vibration of the rotor and the impeller 68 is stopped after the given time period passed, and then the calculated rotational speed becomes zero (or around zero).

In the inertial operation mode, the inverter 72 does not supply three-phase alternating-current power to the pump motor 66. Hence, the three current sensors 74*a*, 74*b*, 74*c* can purely detect the currents based on the induced voltage (induced electromotive force) of the pump motor 66. Then, the estimated rotational speed calculating unit 98 can more accurately obtain the estimated rotational speed of the pump motor 66 in the inertial operation mode, by calculating (or by correcting, for example) the estimated rotational speed by using the signals detected by the individual current sensors 74*a*, 74*b*, 74*c*.

Now, referring to FIG. 4B, a variation of the rotational speed (estimated rotational seed) of the pump motor 66 will be described in a case where the brake mode is performed with the circulating pump 64 being not frozen. Before the execution of the brake mode, the pump motor 66 is not rotating because no electric power is supplied from the inverter 72, or the pump motor 66 is rotated at low rotational speed by the flow of the fuel gas injected by the injector 50. Or, the pump motor 66 is rotating at low rotational speed also when the brake mode was already performed (when the brake mode is repeated multiple times).

Then, the rotational speed of the pump motor 66 is lowered by the execution of the braking mode at the beginning of the brake mode (or the rotational speed of the pump motor 66 remains zero if it is stopped). Further, in the position determining current-passing mode, the rotor is fixed and so the rotational speed of the pump motor 66 becomes zero. Then, the execution of the accelerating current-passing mode raises the rotational speed of the pump motor 66 gradually.

Furthermore, the ECU 80 moves to the inertial operation mode at time t3 at which the rotational speed of the pump motor 66 exceeds the lowest readable rotational speed to some extent. The power supply from the inverter 72 is stopped in the inertial operation mode as described above, and the rotational speed of the pump motor 66 therefore lowers gradually. Then, after ending the inertial operation mode, the ECU 80 moves directly to normal control to rotate the circulating pump 64 continuously, and it can raise the rotational speed of the pump motor 66 to achieve the target rotational speed.

On the other hand, if the circulating pump 64 is frozen, as shown by two-dot chain line in FIG. 4B, the pump motor 66 is unable to rotate (i.e. its rotational speed is zero). The rotational speed therefore remains zero during the execution of the brake mode (braking mode, position determining current-passing mode, accelerating current-passing mode, inertial operation mode). However, when the circulating pump 64 is frozen, the rotor and the impeller 68 may vibrate due to the power supply from the inverter 72, which may cause the ECU 80 to calculate a high rotational speed. This vibration is likely to occur especially in the accelerating current-passing mode. However, in the inertial operation mode, the vibration stops in a short time because the power supply from the inverter 72 is stopped. The rotational-speed unfreezing judging unit 102*b* can thus determine reliably whether the circulating pump 64 is frozen or not based on the detected current (estimated rotational speed).

In the position determining current-passing mode or accelerating current-passing mode, the three-phase alternating-current power having high current values is supplied to the pump motor 66 from the inverter 72. Thus, the three-phase alternating-current power heats the pump motor 66 and raises the temperature of the entirety of the frozen circulating pump 64. In this way, the ECU 80 can promote the unfreezing of the circulating pump 64 by repeatedly performing the brake mode when the circulating pump 64 is frozen.

Returning to FIG. 3, the fuel-gas-temperature unfreezing judging unit 102*c* in the unfreezing control unit 102 is a functional unit that is configured to determine whether the circulating pump 64 has been unfrozen certainly. For example, the fuel-gas-temperature unfreezing judging unit 102*c* has a temperature threshold (given value) for the fuel gas and a given monitoring period threshold (given time) (not shown), and it determines whether the temperature of the fuel gas detected by the temperature sensor 62 is above the temperature threshold over the monitoring period threshold. It is then possible to recognize that the circulating pump 64 has unfrozen certainly. For example, after the circulating pump 64 has been judged to have unfrozen in the brake mode, if the estimated rotational speed of the circulating pump 64 does not rise, then it is possible to accurately determine whether the circulating pump 64 is malfunctioning, by judging whether it has unfrozen based on the temperature of the fuel gas.

Further, the unfinished unfreezing judging and processing unit 102*d* of the unfreezing control unit 102 monitors whether the unfreezing of the circulating pump 64 has been completed, and stores the result if the unfreezing has not been completed (unfreezing-unfinished state). The unfreezing control unit 102 checks the unfreezing-unfinished state and can perform the brake mode again with appropriate timing to solve the unfreezing-unfinished state. The fuel cell system 10 can then utilize the circulating pump 64 effectively when stopping its operation.

In addition, the ECU 80 has an in-stopping power generation control unit 104 therein so as to operate the fuel cell stack 12 to generate power when stopping the operation of the fuel cell system 10. The in-stopping power generation control unit 104 performs in-stopping power generation operation while monitoring a flag indicating the unfreezing-unfinished state.

The in-stopping power generation operation is a control operation that is performed when stopping the fuel cell system 10 in order to dry the inside of the fuel cell stack 12 to prevent the freezing of water contained in the power generation cells 20. With this in-stopping power generation, the fuel cell stack 12 can raise the temperature of the circulating pump 64 through the heat generated by the power generation. Thus, the in-stopping power generation performed when stopping the operation can solve the unfreezing-unfinished state (can unfreeze the circulating pump 64). In addition, the in-stopping power generation can reduce the water vapor in the fuel gas circulation channel 44 as low as possible so that the circulating pump 64 will not be frozen when the fuel cell system 10 is started next time.

The fuel cell system 10 of this embodiment is configured basically as described above. Next, a method for operating the fuel cell system 10 will be described. As mentioned above, the fuel cell system 10 judges whether the circulating pump 64 may be frozen when starting its operation, during normal operation, and when stopping its operation, and performs the unfreezing control operation if there is a possibility that the circulating pump 64 is frozen. As a typical example, operations to perform the freezing judgment and the unfreezing control when starting its operation will be described.

Figure 5:
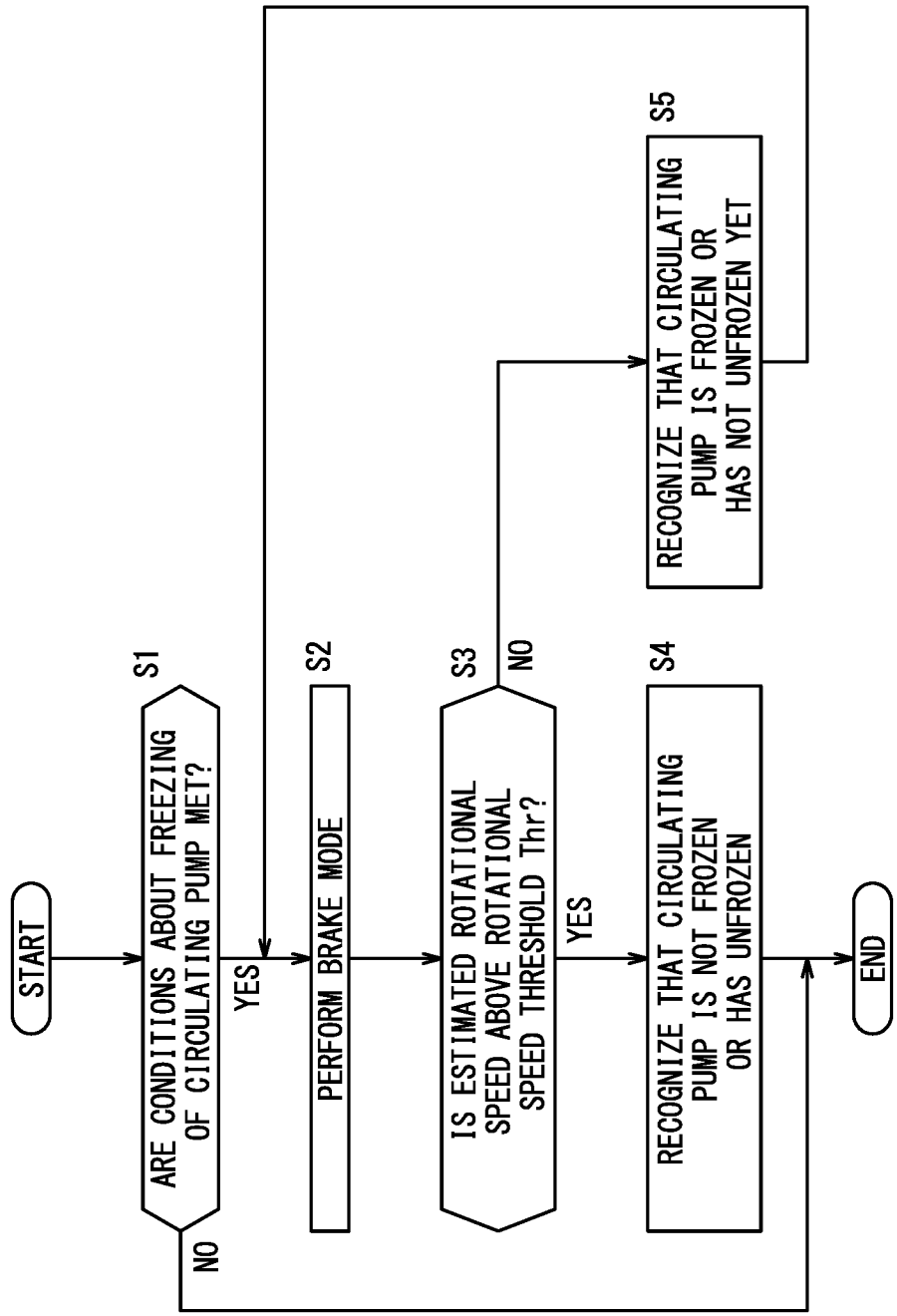
FIG. 5 is a flowchart illustrating a method for operating the fuel cell system (freezing judgment and unfreezing control)

As shown in FIG. 5, the freezing judging unit 100 in the ECU 80 determines whether any of the conditions (a) to (g) listed above is met, for example, as to the possibility of the freezing of the circulating pump 64 (step S1: freezing judging step). Then, if none of the conditions (a) to (g) are met (step S1: NO), then the circulating pump 64 is determined not to be frozen, and this process flow is terminated to move to normal control (normal operation). On the other hand, if any of the conditions (a) to (g) is met (step S1: YES), the process moves to step S2.

In step S2, the mode execution unit 102a of the unfreezing control unit 102 performs the brake mode (first step). As shown in FIG. 4A, the braking mode, the position determining current-passing mode, the accelerating current-passing mode, and the inertial operation mode are sequentially performed in a short time (e.g. several seconds) in the brake mode. Especially, the execution of the position determining current-passing mode and the accelerating current-passing mode can promote the temperature rise of the circulating pump 64 through the supply of large current from the inverter 72 to the pump motor 66.

Then, in the inertial operation mode, the rotational-speed unfreezing judging unit 102b in the ECU 80 determines whether the estimated rotational speed of the pump motor 66 exceeds the rotational speed threshold Thr (given value: a lowest readable rotational speed: 300 rpm) (step S3: second step). If the estimated rotational speed exceeds the rotational speed threshold Thr (step S3: YES), it is recognized that the circulating pump 64 is not frozen or has unfrozen (step S4). On the other hand, if the estimated rotational speed is equal to or lower than the rotational speed threshold Thr (step S3: NO), it is recognized that the circulating pump 64 is frozen or has not unfrozen yet (step S5).

If the unfreezing control unit 102 recognizes that the circulating pump 64 is frozen (not unfrozen) (after step S5), it returns to step S2 to repeat the brake mode from the beginning. That is, by repeating the brake mode, the fuel cell system 10 can further raise the temperature of the circulating pump 64 during the execution of the position determining current-passing mode and the accelerating current-passing mode.

On the other hand, when recognizing that the circulating pump 64 has unfrozen (after step S4), the ECU 80 ends this process flow and moves to normal control. In this way, when starting, the fuel cell system 10 can rotate the circulating pump 64 as needed to circulate the fuel gas in the fuel gas circulation channel 44 into the fuel gas supply channel 40. The fuel gas flow fields 32 in the fuel cell stack 12 are thus supplied with a large amount of fuel gas, which improves its power generating performance and reduces its deterioration that would be caused by insufficient supply of hydrogen.

Furthermore, when the fuel-gas-temperature unfreezing judging unit 102c in the ECU 80 makes the determination that the circulating pump 64 has unfrozen or is not frozen, it determines that the circulating pump 64 has certainly unfrozen by using the temperature information detected by the temperature sensor 62 and the temperature threshold and monitoring period threshold corresponding to the temperature information. For example, while repeating the brake mode to unfreeze the circulating pump 64 (during the process flow above), the fuel-gas-temperature unfreezing judging unit 102c judges whether the temperature of the fuel gas flowing through the circulating pump 64 is equal to or higher than the temperature threshold over the given monitoring period threshold, based on the temperature information from the temperature sensor 62. The fuel-gas-temperature unfreezing judging unit 102c can thus recognize that the circulating pump 64 has unfrozen certainly. Then, if the rotational speed of the circulating pump 64 does not rise in this case, it determines that the circulating pump 64 has a fault. That is, the ECU 80 can clearly distinguish between fault and freezing of the circulating pump 64, thereby preventing the malfunctioning circulating pump 64 from being operated without any measure being taken.

Figure 6:
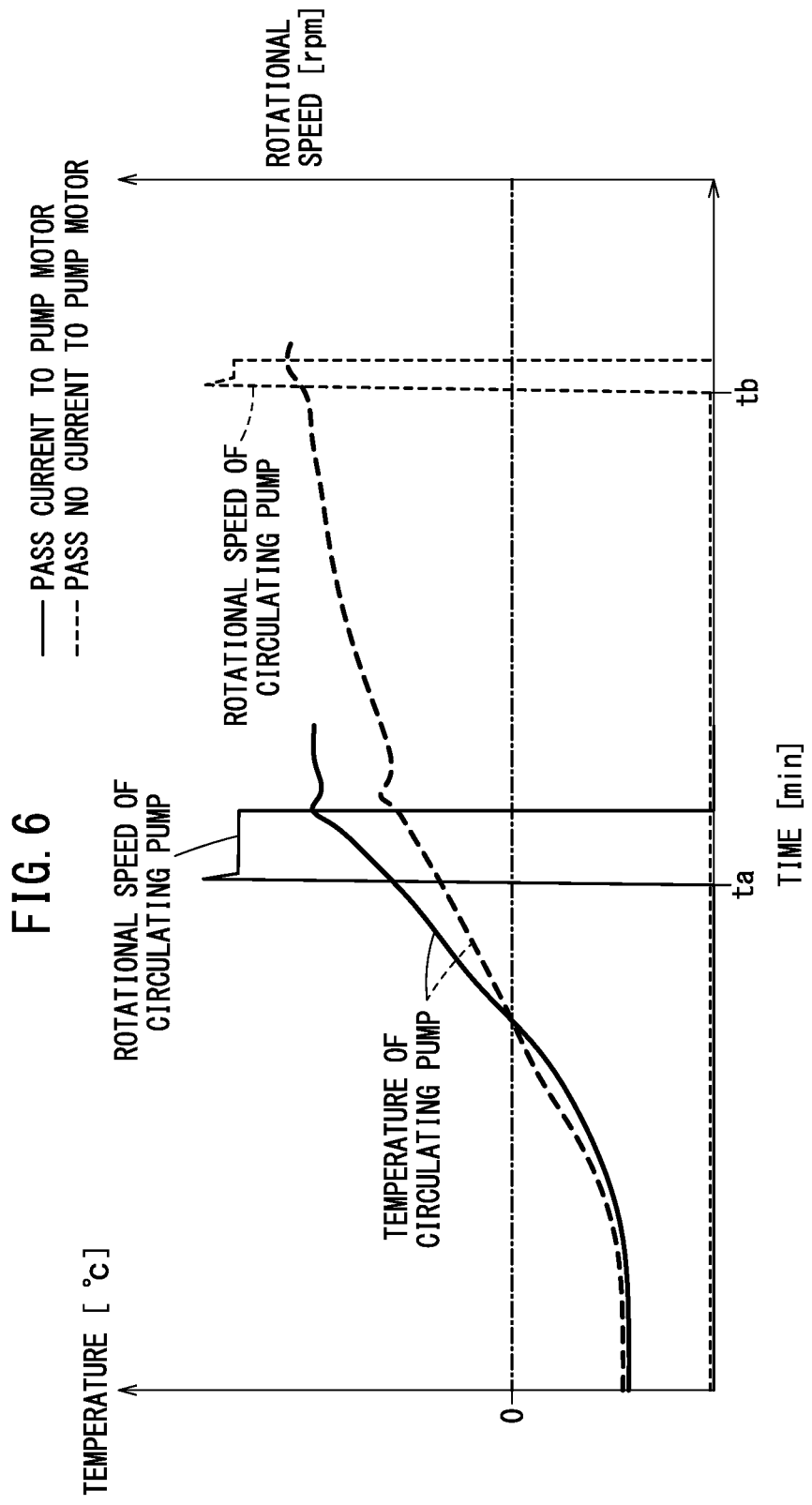
FIG. 6 is a graph illustrating variations in the temperature and rotational speed of the pump motor in the presence and absence of current passed thereto.

Next, referring to FIG. 6, a description will be given on, when the circulating pump 64 is frozen, how differently the temperature of the fuel gas varies, and when the circulating pump 64 starts operating, in an operation performing the brake mode according to the process flow above and an operation not passing current to the pump motor 66. In the graph of FIG. 6, the horizontal axis shows time and the vertical axes show the fuel gas temperature and the rotational speed of the circulating pump 64.

When the pump motor 66 is not electrified, as shown by broken line in FIG. 6, the temperature of the fuel gas flowing through the circulating pump 64 rises slowly. Consequently, the time tb at which the fuel gas temperature reaches a value that unfreezes the circulating pump 64 is delayed. When the time tb is reached, the circulating pump 64 unfreezes and its rotational speed rises.

On the other hand, when the pump motor 66 is electrified, as shown by the solid line in FIG. 6, the temperature of the fuel gas flowing through the circulating pump 64 rises more steeply than when the pump motor 66 is not electrified. Accordingly, the time ta that the fuel gas temperature requires to reach the temperature at which the circulating pump 64 unfreezes is considerably shorter than the time tb. Then, when the time ta is reached, the circulating pump 64 unfreezes and its rotational speed rises. That is, it can be said that, in order to unfreeze the circulating pump 64 having the sensorless pump motor 66, performing the brake mode of the pump motor 66 is effective.

As mentioned above, the circulating pump 64 may freeze again after it was judged to have unfrozen. The freezing judging unit 100 may perform the freezing judging step at given time intervals (e.g. several minutes) to judge whether it is frozen. In this case, in the freezing judging step, the freezing judging unit 100 checks the difference between the target rotational speed of the circulating pump 64 and the estimated rotational speed of the pump motor 66 that is based on the detection of the current sensors 74. If the difference between the target rotational speed and the estimated rotational speed is large, the circulating pump 64 may be freezing halfway. That is, the freezing judging unit 100 can find the re-freezing of the circulating pump 64 in an early stage to perform the unfreezing control operation (unfreezing by the execution of the brake mode).

Alternatively, the freezing judging unit 100 may be configured to determine whether the circulating pump 64 is frozen or not on the basis of the rotational speed of the circulating pump 64 also when the circulating pump 64 is actually rotated (used for operation) during normal operation, or when stopping the operation. Then, if the circulating pump 64 is frozen, the fuel cell system 10 can perform the unfreezing control operation again, without determining whether the circulating pump 64 is malfunctioning.

Further, when the operation of the vehicle 11 is stopped, the fuel cell system 10 performs the in-stopping power generation process of the fuel cell stack 12, in addition to the unfreezing by the brake mode of the pump motor 66. This further promotes the unfreezing of the circulating pump 64, enabling the circulating pump 64 to be used effectively in the process to stop the operation of the fuel cell system 10. Furthermore, the in-stopping power generation operation reduces the water content in the power generation cells 20 and thus considerably reduces the water vapor present in the fuel gas discharge channel 42 and the fuel gas circulation channel 44. This prevents the circulating pump 64 from freezing and enables the circulating pump 64 to be used effectively at the next starting.

The present invention is not limited to the embodiments described above, and various modifications are possible according to the essence and gist of the invention.

Second Embodiment

Figure 7:
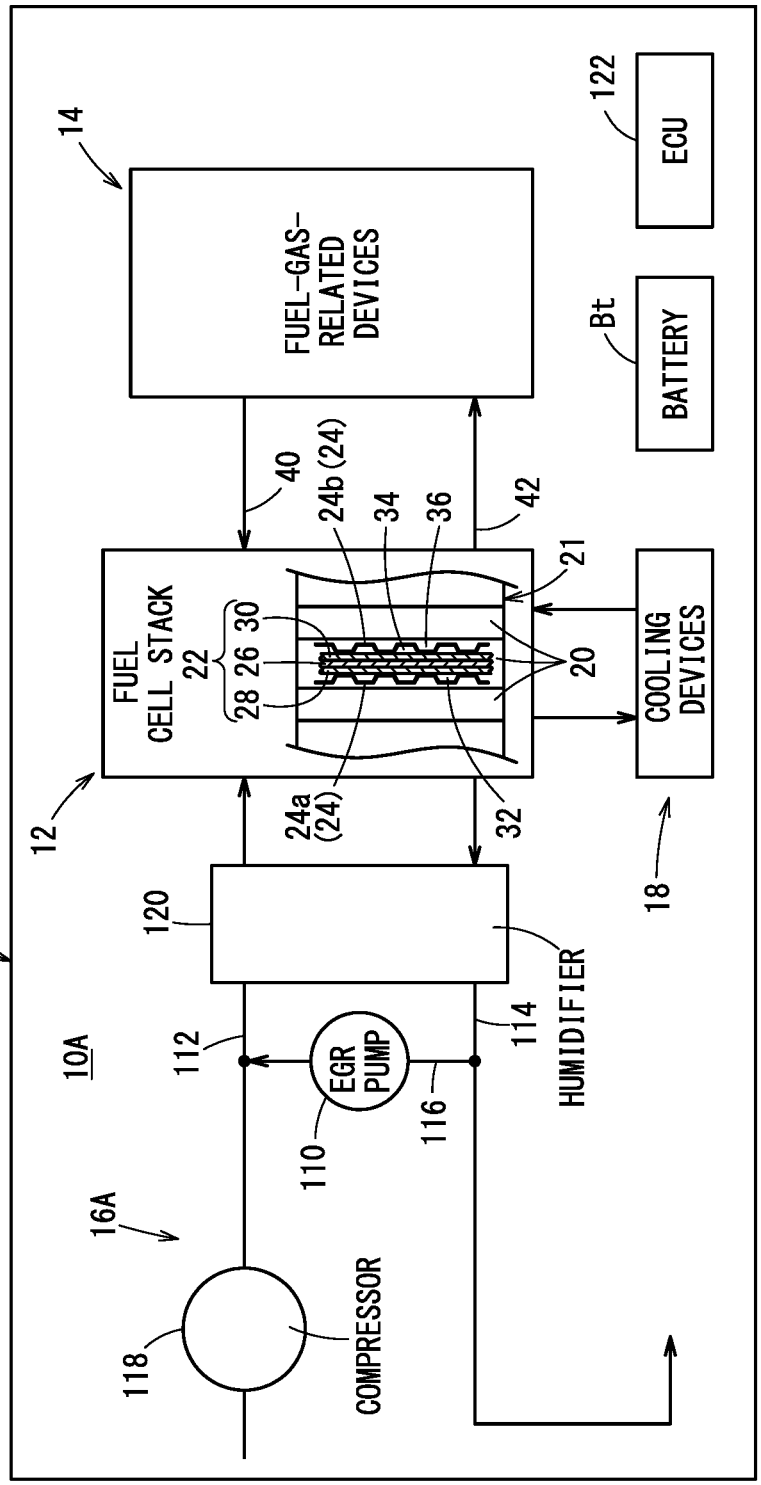
FIG. 7 is a block diagram schematically illustrating an overall configuration of a fuel cell system according to a second embodiment of the invention.

In a fuel cell system 10A according to a second embodiment shown in FIG. 7, oxygen-containing-gas-related devices 16A include a circulating pump 110 (EGR pump) for circulating the oxygen-containing off-gas discharged from the fuel cell stack 12. Also in the fuel cell system 10A, the freezing judgment and unfreezing control can be applied to the circulating pump 110 in the same way as described above.

For example, among the oxygen-containing-gas-related devices 16A, the circulating pump 110 is provided on an oxygen-containing gas circulation channel 116 that connects an oxygen-containing gas supply channel 112 through which the oxygen-containing gas supplied to the fuel cell stack 12 flows and an oxygen-containing gas discharge channel 114 through which the oxygen-containing off-gas discharged from the fuel cell stack 12 flows. Further, the oxygen-containing gas circulation channel 116 is connected between a compressor 118 and a humidifier 120. Under the control of an ECU 122 for the oxygen-containing-gas-related devices 16A, the circulating pump 110 operates when, for example, stopping the operation, so as to circulate the oxygen-containing off-gas that has passed through the humidifier 120 back into the oxygen-containing gas supply channel 112.

The oxygen-containing off-gas, too, contains water vapor, and so the circulating pump 110 may freeze. Accordingly, by performing the freezing judgment and unfreezing control, the ECU 122 can unfreeze the circulating pump 110 so that the circulating pump 110 can be driven at appropriate timing, for example, when the operation is stopped.

Technical ideas and effects that can be grasped from the embodiments described above will be recited below.

A first aspect of the invention provides a method of operating a fuel cell system 10, 10A including a fuel cell stack 12, a reactant gas supply channel (fuel gas supply channel 40, oxygen-containing gas supply channel 112) for supplying a reactant gas into the fuel cell stack 12, a reactant gas circulation channel (fuel gas circulation channel 44, oxygen-containing gas circulation channel 116) for circulating a reactant off-gas discharged from the fuel cell stack 12 back into the reactant gas supply channel, a circulating pump 64, 110 provided on the reactant gas circulation channel and driven by a motor (pump motor 66) having no rotation detecting sensor, and a control unit (ECU 80, 122) configured to control rotation of the motor. The fuel cell system operating method includes: a freezing judging step of, in a low-temperature environment, causing the control unit to determine whether the circulating pump 64, 110 is frozen or not; a first step of, if the freezing judging step determines that the circulating pump 64, 110 is frozen, performing a brake mode to limit the rotation of the motor while passing current to the motor, to thereby heat the circulating pump 64, 110; and a second step of, after rotating the motor, comparing the rotational speed of the motor with a given value (rotational speed threshold Thr) and determining that the circulating pump 64, 110 has unfrozen if the rotational speed of the motor exceeds the given value.

The method of operating the fuel cell system 10, 10A can efficiently unfreeze the frozen circulating pump 64, 110 by performing the brake mode. As the circulating pump 64, 110 unfreezes, the circulating pump 64, 110 can be operated with good timing when necessary even in a low-temperature environment, to thereby circulate the reactant gas stably. For example, through the circulation of the reactant gas by the circulating pump 64, 110, the fuel cell system 10, 10A offers effects of shortening the processing time when starting its operation, effectively performing processes (in-stopping power generation etc.) for improving the durability of the fuel cell stack 12 when stopping its operation, and so on. This improves the marketability of the fuel cell system 10, 10A.

In the second step, the method determines that the circulating pump 64, 110 is frozen if the rotational speed of the motor (pump motor 66) is equal to or lower than the given value, and performs the first step again. Thus, the fuel cell system 10 can continuously raise the temperature of the circulating pump 64, 110 through the brake mode so as to effectively unfreeze the circulating pump 64, 110.

In the second step, the method compares the rotational speed of the motor with the given value in a period in which the supply of electric power to the motor (pump motor 66) is stopped so that the motor rotates by inertia. Thus, the fuel cell system 10, 10A can accurately recognize the rotational speed of the motor to correctly judge whether the circulating pump 64, 110 is frozen.

The motor (pump motor 66) is configured to rotate based on supply of three-phase alternating-current power, and in the first step, the method rotates the motor gradually by increasing the current value of the three-phase alternating-current power in stages from a state in which the rotation of the motor is stopped. Thus, the fuel cell system 10, 10A can smoothly switch the operation to raise the temperature of the circulating pump 64, 110 and the operation to determine whether the circulating pump 64, 110 is frozen based on the rotational speed of the motor, by continuously performing the first step and the second step.

The control unit (ECU 80, 122) performs the freezing judging step of determining whether the circulating pump 64, 110 is frozen or not at given time intervals by comparing a target rotational speed of the circulating pump 64, 110 with an estimated rotational speed of the motor (pump motor 66) that is based on detection by a sensor (current sensor 74). Thus, even if the circulating pump 64, 110 once unfreezes and then freezes again during the operation of the fuel cell system 10, 10A, it can be unfrozen by performing the unfreezing control again (the first step and second step).

If the operation of the fuel cell system 10, 10A is stopped without the method determining that the circulating pump 64, 110 has unfrozen while performing the first step and the second step, then the method performs an in-stopping power generation of the fuel cell stack 12 and utilizes the heat generated by the in-stopping power generation to unfreeze the circulating pump 64, 110. Thus, the fuel cell system 10, 10A can further promote the unfreezing of the circulating pump 64, 110 by the in-stopping power generation.

The fuel cell system 10, 10A further includes a temperature sensor 62 for detecting the temperature of the reactant gas discharged from the fuel cell stack 12, and the method determines that the circulating pump 64, 110 has a fault if the circulating pump 64, 110 does not rotate when the temperature of the reactant gas is equal to or higher than a given value and a given time has passed. Thus, the fuel cell system 10, 10A can distinguish between freezing and malfunctioning of the circulating pump 64, 110 so as to prevent the circulating pump 64, 110 from being misjudged to be frozen when it is malfunctioning in fact, and to prevent it from being operated without any measure being taken.

What is claimed is:

1. A method of operating a fuel cell system including:
   a fuel cell stack,
   a reactant gas supply channel configured to supply a reactant gas into the fuel cell stack,
   a reactant gas circulation channel configured to circulate a reactant off-gas discharged from the fuel cell stack back into the reactant gas supply channel,
   a circulating pump provided on the reactant gas circulation channel and driven by a motor having no rotation detecting sensor, the motor being configured to rotate based on supply of three-phase alternating-current power from an inverter, and
   a control unit configured to control rotation of the motor, the method comprising:
   in a low-temperature environment, causing the control unit to determine whether the circulating pump is frozen or not;
   if the circulating pump is determined to be frozen, a first step of performing a brake mode to limit the rotation of the motor while passing a three-phase alternating-current to the motor, to thereby heat the circulating pump; and
   a second step of, after rotating the motor, comparing a rotational speed of the motor with a given value and determining that the circulating pump has unfrozen if the rotational speed of the motor exceeds the given value,
   wherein the brake mode in the first step includes a position determining current-passing mode in which the method controls the inverter to output the three-phase alternating-current with one phase being zero and two phases being opposite to each other, in order to stop the rotation of the motor.

2. The method of operating the fuel cell system according to claim 1, wherein in the second step, the method determines that the circulating pump is frozen if the rotational speed of the motor is equal to or lower than the given value, and heats the circulating pump again by performing the brake mode in the first step.

3. The method of operating the fuel cell system according to claim 1, wherein in the second step, the method compares the rotational speed of the motor with the given value in a period in which supply of electric power to the motor is stopped so that the motor rotates by inertia.

4. The method of operating the fuel cell system according to claim 1, wherein
   the brake mode in the first step further includes an accelerating current-passing mode in which while shifting the phases of the three-phase alternating current in a manner as to gradually narrow a period of the three-phase alternating current, the method rotates the motor gradually by increasing the three-phase alternating-current in stages, from a state in which the rotation of the motor is stopped in the position determining current-passing mode.

5. The method of operating the fuel cell system according to claim 1, wherein the method determines whether the circulating pump is frozen or not at given time intervals by comparing a target rotational speed of the circulating pump with an estimated rotational speed of the motor that is based on detection by a sensor configured to detect the three-phase alternating current.

6. The method of operating the fuel cell system according to claim 1, wherein if an operation of the fuel cell system is stopped in an unfreezing-unfinished state in which the method determines that the circulating pump has not completely unfrozen in the second step after the circulating pump is heated in the first step, then the method performs an in-stopping power generation of the fuel cell stack and utilizes heat generated by the in-stopping power generation to unfreeze the circulating pump.

* * * * *